United States Patent [19]

Edahiro et al.

[11] 4,414,008

[45] Nov. 8, 1983

[54] PROCESS FOR PRODUCING OPTICAL FIBER PREFORM

[75] Inventors: Takao Edahiro, Ibaraki; Tetsuo Miyajiri, Kanagawa; Hiroshi Yokota, Kanagawa; Toru Kuwahara, Kanagawa, all of Japan

[73] Assignees: Nippon Telegraph & Telephone Public Corporation, Tokyo; Sumitono Electric Inds., Ltd., Osaka, both of Japan

[21] Appl. No.: 329,919

[22] Filed: Dec. 11, 1981

[30] Foreign Application Priority Data

Dec. 12, 1980 [JP] Japan .................. 55-174729

[51] Int. Cl.³ .................. C03B 19/00; C03B 37/07
[52] U.S. Cl. .................. 65/3.12; 65/18.2
[58] Field of Search .................. 65/18.2, 3.12, 32, 144, 65/157

[56] References Cited

U.S. PATENT DOCUMENTS 4,259,101  3/1981  Tsukuda et al. .................. 65/18.2
4,367,085  1/1983  Suto et al. .................. 65/3.12 X

FOREIGN PATENT DOCUMENTS 54-103058  8/1979  Japan .................. 65/18.2

OTHER PUBLICATIONS

Suda et al., "Transmission Loss In . . . V.A.D. Fibers", Electronic Letters, vol. 16, No. 21, Oct. 9, 1980, pp. 802–803.

Primary Examiner—Richard V. Fisher
Attorney, Agent, or Firm—Sughrue, Mion, Zinn, Macpeak, and Seas

[57] ABSTRACT

A process for producing a porous optical fiber preform by hydrolyzing a gaseous glass forming material with a flame from an oxyhydrogen burner and depositing the resulting soot in a rod form in a muffle furnace is described, wherein the muffle furnace is supplied with a gas other than that from the oxyhydrogen burner, and said gas is maintained at a constant temperature.

2 Claims, 1 Drawing Figure

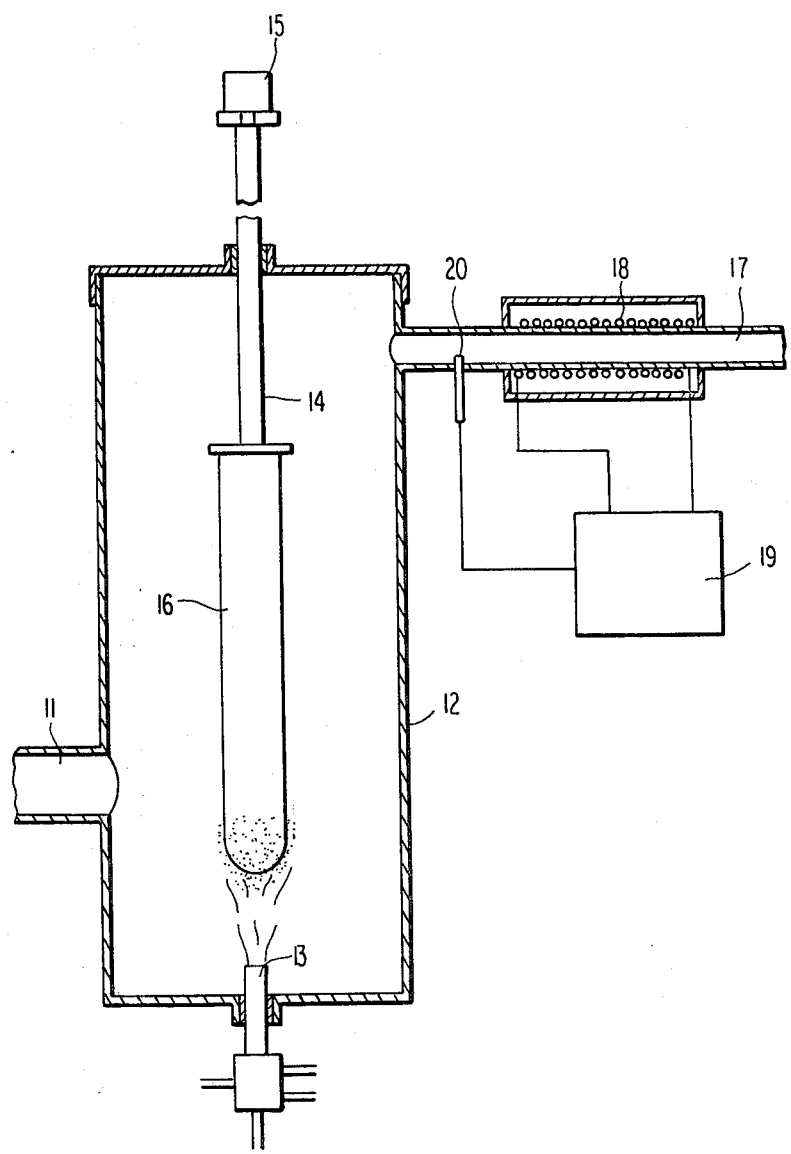

PROCESS FOR PRODUCING OPTICAL FIBER PREFORM

FIELD OF THE INVENTION

The present invention relates to a process for producing a porous optical fiber perform that has only a small variation in the distribution of refractive index in an axial direction and which hence has improved frequency characteristics, and an apparatus therefor.

BACKGROUND OF THE INVENTION

Fiber optics technology has advanced to such a level that it is now possible to fabricate a product having a transmission loss reduced essentially to the theoretical limit. However, most of the long fibers that can be used for communications without repeaters have transmission losses greater than the theoretically possible level, and this is due largely to the uneven distribution of refractive index in an axial direction. Optical fibers are generally produced by a method comprising hydrolyzing (oxidizing) a gaseous glass forming material with the flame from an oxyhydrogen burner, and depositing the resulting soot in a rod shape which is then sintered in an electric furnace to make transparent glass which then is drawn to form a fiber. The soot usually contains a dopant that modifies the refractive index of the glass, so if the gas current in the protective vessel (muffle furnace) wherein the soot deposits to form the porous optical fiber preform becomes turbulent, the flame flickers, causing uneven distribution of refractive index.

The conventional apparatus for producing an optical fiber preform is so designed that a given amount of a gas such as an inert gas (e.g., helium) or air is supplied to the muffle furnace continuously. The gas is not involved in the flame hydrolysis at all, but removes the waste gases from the deposition such as unreacted silicon tetrachloride gas, as well as hydrogen chloride gas and steam formed as by-products from the muffle furnace as quickly as possible so that impurities do not deposit on the rod of the optical fiber preform once formed.

However, the present inventors have found that when a gas at room temperature is supplied to the muffle furnace having relatively high temperatures, violent convection currents form in the muffle furnace, causing the flame to flicker greatly. The surface temperature of the porous optical fiber being formed in the muffle furnace, especially that part which is at the tip of the supporting rod that faces the flame, has a great effect on the rate at which the soot is formed and deposited. The present inventors have also found that variations in the temperature of the gas supplied to the muffle furnace eventually causes a change in the surface temperature of the face of the soot.

SUMMARY OF THE INVENTION

Therefore, one object of the present invention is to provide a process for producing an optical fiber preform having minimal variations in the distribution of refractive index. This is accomplished by minimizing turbulence in the gas currents in the muffle furnace and maintaining the surface temperature of the preform constant.

Another object of the present invention is to provide long optical fibers having improved frequency characteristics by using such preform.

A further object of the present invention is to provide an apparatus for producing a porous optical fiber preform.

These objects of the present invention are achieved by a process for producing a porous optical fiber preform by hydrolyzing a gaseous glass forming material with a flame from an oxyhydrogen burner and depositing the resulting soot in a rod form in a muffle furnace, wherein the muffle furnace is supplied with a gas other than that from the oxyhydrogen burner, said gas being maintained at a constant temperature.

BRIEF DESCRIPTION OF THE DRAWING

The accompanying drawing illustrates the operation of the process of the present invention according to one embodiment wherein an optical fiber preform is fabricated by vapor-phase axial deposition.

PREFERRED EMBODIMENT OF THE INVENTION

The process of the present invention is hereafter described by reference to the accompanying drawing which illustrates the operation of one embodiment wherein a preform is produced by vapor-phase axial deposition. A muffle furnace 12 has an exhaust port 11 in the lower part of the side wall. In order to prevent stagnation of gas in the muffle furnace, the input pipe and the exhaust port are preferably disposed in the muffle furnace at the positions as far as possible from each other. In the cylindrical muffle furnace positioned vertically as illustrated in FIGURE, the input pipe is preferably disposed at a higher position and the exhaust port is preferably disposed at a lower position. However, the exhaust port is desirably disposed at a position higher than the upper end of the burner so as to prevent a turbulent flow of upward gases issued from the burner and to exhaust effectively unreacted gases and by-product gases. For example, in the muffle furnace illustrated in FIGURE used in the embodiment of this invention, the exhaust port 11 is disposed at a distance of about 150 mm from the upper end of the burner 13. An oxyhydrogen flame burner 13 is disposed in the bottom of the muffle furnace, and a gaseous glass forming material and a dopant issue therefrom as well as oxygen and hydrogen to provide a predetermined distribution of the gases in the interior of the muffle furnace, so that the glass forming material is hydrolyzed by the flame to form glass soot. The muffle furnace includes a supporting rod (Meade rod) 14 which is inserted into the muffle furnace 12 through an opening in the top and on which the glass soot deposits in a rod shape. As the soot builds up, the rod 14 is pulled up as it is rotated by a rotating mechanism 15, leaving a grown porous optical fiber preform on the tip of the rod 14.

To the upper part of the side wall of the muffle furnace 12 is connected a pipe 17 through which a gas such as air or helium for causing the gases produced in the muffle furnace to flow smoothly in a consistent direction is fed in, and this pipe is partially enclosed by a heater 18 for heating the gas flowing through it. The heater 18 is controlled by a power control means 19 in response to a signal from a thermocouple 20 installed in a part of the pipe 17 between the muffle furnace and the heater.

The temperature of the gas flowing into the muffle furnace through the pipe 17 is preset at a level slightly lower than the temperature of the gas within the muffle furnace, so that when it enters the muffle furnace, it descends toward the exhaust port 11 due to the difference in specific gravity, and at the same time, waste gas in the upper part of the muffle furnace is carried by it and is exhausted from the muffle furnace. As a result, the waste gas, which may have adverse effects on the optical fiber preform 16, is removed from the muffle furnace very quickly. However, on the other hand, the supply of a large volume of the gas is not preferred since it increases the chance of forming turbulent convection currents in the muffle furnace. For example, in a conventional cylindrical muffle furnace having a diameter of 300 mm and a height of 800 mm, the supply of the gas in a volume more than about 1 m³/minute causes flickering of flame more than 10 millimeters in the center of the flame. On the other hand, the supply of gas in a too small volume, e.g., less than 10 liters/minute, does not serve for effective exhaust of unreacted gas and by-product gases. The volume of gas introduced into the muffle furnace varies predominantly depending upon various factors such as the shape and the inner volume of muffle furnace used, the diameter of exhaust port, the rate of gases issued from the burner and the like. For example, in the above-described cylindrical muffle furnace, the volume of gas can be about 20 to about 500 liters/minute, preferably 50 to 100 liters/minute. It is preferred to maintain the volume gas at a constant rate during the production of soot. When the gas is supplied at a higher rate, the capacity of heater 18 should correspondingly be increased so as to heat the gas to a temperature at the desired level.

The temperature distribution in the muffle furnace is generally very high and the temperature varies with a rate of gases issued from the burner, i.e., the production rate of soot. The temperature of the gas flowing into the muffle furnace is preferably adjusted to a level slightly (less than about 50° C.) lower than the average temperature of the gas within the muffle furnace.

The present invention is further illustrated by the following Examples, but they are not to be construed as limiting the present invention.

EXAMPLE

Air heated to 150° C. was supplied at a rate of 40 liters per minute to the muffle furnace having an outside diameter of 300 mm and a height of 800 mm and having an exhaust port of 40 mm diameter. On the other hand, $SiCl_4$ as a gaseous glass forming material was supplied from the burner at a rate of 1.5 g/minute with argon as a carrier gas at a flow rate of 150 cc/minute, and 4 l/minute of hydrogen, 7 l/minute of oxygen, 2 l/minute of argon as a seal gas from a nozzle between the nozzles for supplying the hydrogen and oxygen gases, and 0.2 g/minute of $GeCl_4$ with argon as a carrier gas at a flow rate of 100 cc/minute were supplied from the burner. The area around the middle part of the side wall of the muffle furnace became as hot as 180° C., and the flickering in the center of the flame was limited to less than 2 milliliters in diameter. The soot was formed at a deposition rate of 0.4 g/minute. The resulting deposited soot having a diameter of 50 mm and a length of 400 mm was vitrifies (collapsed) into a transparent preform 16, and the preform was drawn into a fiber which could transmit a signal in a frequency range up to 800 MHz.

COMPARATIVE EXAMPLE

Unheated air (room temperature) was supplied to the muffle furnace at a rate of 40 liters per minute, the area around the middle part of the side wall became only as hot as 110° C. and the center of the flame flickered to an extent of 7 millimeters in diameter. The optical fiber obtained by depositing the resulting soot and drawing the same resulted in a fiber which could transmit a signal in a frequency range of only up to 500 MHz.

It is therefore understood that the process of the present invention is very effective for producing an optical fiber preform having minimum variation in the distribution of refractive index in an axial direction.

While the invention has been described in detail and with reference to specific embodiments thereof, it will be apparent to one skilled in the art that various changes and modifications can be made therein without departing from the spirit and scope thereof.

What is claimed is:

1. A process for producing a porous optical fiber preform by hydrolyzing a gaseous glass forming material with a flame from an oxyhydrogen burner and depositing the resulting soot in a rod form in a muffle furnace, wherein the muffle furnace is supplied with a preheated gas other than that from the oxyhydrogen burner, said preheated gas being air supplied at a constant temperature at a level slightly lower than the temperature of the gas within the muffle furnace.

2. A processing according to claim 1, wherein said preheated air has a temperature less than 50° C. lower than the average temperature of the gas within the muffle furnace.

* * * * *